(12) United States Patent
Liang et al.

(10) Patent No.: US 10,389,826 B2
(45) Date of Patent: Aug. 20, 2019

(54) WEBPAGE PRE-READING METHOD, APPARATUS AND SMART TERMINAL DEVICE

(71) Applicant: Guangzhou UCWEB Computer Technology Co., Ltd., Guangzhou (CN)

(72) Inventors: Jie Liang, Guangzhou (CN); Yuxin Jiang, Guangzhou (CN); Wenqing Yao, Guangzhou (CN); Huocheng Wu, Guangzhou (CN); Yanwei Xu, Guangzhou (CN); Yanjun Liang, Guangzhou (CN); Yan Lu, Guangzhou (CN); Jiawei Qiu, Guangzhou (CN)

(73) Assignee: Guangzhou UCWeb Computer Technology Co., Ltd., Guangzhou (CN)

( * ) Notice: Subject to any disclaimer, the term of this patent is extended or adjusted under 35 U.S.C. 154(b) by 488 days.

(21) Appl. No.: 15/206,089

(22) Filed: Jul. 8, 2016

(65) Prior Publication Data
US 2017/0013072 A1 Jan. 12, 2017

(30) Foreign Application Priority Data
Jul. 9, 2015 (CN) .......................... 2015 1 0406280

(51) Int. Cl.
*H04L 29/08* (2006.01)

(52) U.S. Cl.
CPC .............. *H04L 67/22* (2013.01); *H04L 67/02* (2013.01); *H04L 67/2847* (2013.01)

(58) Field of Classification Search
None
See application file for complete search history.

(56) References Cited

U.S. PATENT DOCUMENTS

| 6,023,726 A | * | 2/2000 | Saksena | ............ G06F 17/30902 |
| | | | | 709/219 |
| 2014/0136973 A1 | * | 5/2014 | Kumar | ............ G06F 17/30902 |
| | | | | 715/274 |

FOREIGN PATENT DOCUMENTS

| CN | 102663012 A | 9/2012 |
| CN | 102737037 A | 10/2012 |
| CN | 103440297 A | 12/2013 |
| CN | 104519473 A | 4/2015 |

* cited by examiner

*Primary Examiner* — Jeffrey R Swearingen
(74) *Attorney, Agent, or Firm* — Sheppard Mullin Richter & Hampton LLP (57) ABSTRACT

The present invention provides a webpage pre-reading method, apparatus and a smart terminal device. The webpage pre-reading method includes: acquiring information of one or more users accessing multiple webpages within a first period of time; determining click paths through each of which a second webpage is clicked and entered from a first webpage and the number of clicks thereof; determining a first confidence value of each click path; generating a first pre-reading list including the click paths based on the first confidence values; and querying for a click path of a currently browsed webpage from the first pre-reading list so as to pre-read data of a corresponding target webpage to be browsed.

19 Claims, 7 Drawing Sheets

WEBPAGE PRE-READING METHOD, APPARATUS AND SMART TERMINAL DEVICE

CROSS-REFERENCE TO RELATED APPLICATIONS

This application is based upon and claims priority to Chinese Patent Application No. 201510406280.0, filed Jul. 9, 2015, the entire contents of which are incorporated herein by reference.

TECHNICAL FIELD

The present disclosure relates to the field of webpage browsing technologies, and more particularly to a webpage pre-reading method, apparatus and a smart terminal device.

BACKGROUND

With wide use of the Internet and the use of computers as one of the essential tools for family and work, people use browsers on the computers to access the Internet more frequently. Especially with rapid popularization of smart terminal devices, for example, smartphones and tablet computers, it becomes a daily behavior that a user uses a terminal browser to access the Internet. In the process that the user uses a browser to open a webpage, if a current network environment is restricted or the processing speed of a terminal device is limited, the speed of opening the webpage may be affected, resulting in that the user waits and the user's online experience is very poor. A main reason affecting the opening speed of the webpage is that the time to download content of the webpage is too long.

At present, a user's demand for quickly opening a webpage is met generally by employing a method of pre-reading a webpage possibly needed. The method is mainly as follows: in a process that a user browses a current webpage, a server side acquires webpages that the user may want in the next step. Before the user browses the webpages, websites of the webpages and resources thereof are first loaded into a local cache. When the user accesses a certain webpage therein, related data is directly read from the local cache and displayed to the user for reading, which avoids a process of waiting for downloading the webpage and shortens the webpage response time after the user performs a webpage access operation.

There are two common existing webpage pre-reading methods as follows:

The first one is that, when a user browses a certain webpage of continuous content, one or more keywords linked to adjacent webpages, for example, "page down", "next page" and so on, included on the webpage are pre-read, and then linked webpage content is taken in sequence and placed in a local cache.

The second one is that, a webpage list is acquired from a server side, and then content of each webpage in the webpage list is read in sequence and placed in a local cache.

It can be known from the above that the first existing webpage pre-reading method is only applicable to particular webpages, that is, the method is only effective where a longer content is split into multiple webpages linked with hyperlinks. While for a great number of other webpages in the absence of a page number sequence, for example, news webpages and so on, with such a method, it is impossible to pre-read webpages that may be accessed by the user subsequently, and thus display of webpages by the browser cannot be sped up. In the second existing webpage pre-reading method, it is necessary to pre-read a significant amount of data and load the data into a local cache, which seriously occupies cache space and even leads to occurrence of insufficient cache space.

Some new pre-reading methods are also proposed to try to improve user experience.

For example, an idea of "guessing" webpages possibly to be accessed by users based on hot links on the webpages is proposed. With this method, webpages are pre-read, to improve effectiveness of pre-reading. For example, in a Chinese patent document disclosed on Sep. 12, 2012 with the Application Number of 201210074771.6 and entitled "a webpage pre-loading method and system," the method includes: determining a hot link contained in a source webpage, and preloading a target webpage corresponding to the hot link. The manner of determining a hot link disclosed in the patent document is a method that is well known by persons skilled in the art. For example, one way of determining whether a certain link in a source page A is a hot link or not is based on the total number of times the link is clicked. Another way is based on an order that the user clicks each link. With such a method, the accuracy of determining the hot link is low. For example, the patent document with the Application Number of 201210074771.6 describes, in paragraph 0099, "in an actual application, a situation may exist where, although a user clicks a certain link, the user may not like or may not particularly like the link, and in this situation, if whether or not a link is a hot link is distinguished simply through the number of clicks, it may cause a result to be not accurate enough." Similarly, the accuracy of determining a hot link based on an order that the user clicks each link is also low. For example, a situation also exists where the user is interested in multiple hot links included on the source page, while he/she may not click the hot links according to a certain order every day, and when hot spot information appears in a certain hot link, it is likely that the user first clicks the hot link. For example, during the football World Cup, the user may first click competition news of the World Cup; during the World Cup, if a new product release meeting is held for a famous brand, the user may first click a hot link about the new product. Even if the two manners are combined, the accuracy of determining a hot link in the combined manner may also be low.

In addition, the patent document with the Application Number of 201210074771.6 does not take into account the problem that the attention to a hot link attenuates with time. For example, in a period of time after the final NBA basketball game in the United States ends, a user's attention to the NBA column will be significantly reduced. For another example, hot news or hot headlines appear every day, the attention to today's hot news or hot headlines may be reduced tomorrow, and it is likely that nobody will pay attention thereto one week later.

For another example, an idea of "guessing" webpages possibly to be accessed by users based on the users' browsing habits is also proposed. By this method, the targeted webpages are pre-read to improve effectiveness of pre-reading. For example, in a Chinese patent document disclosed on Oct. 17, 2012 with the Application Number of 201110086435.9 and entitled "a webpage pre-reading method, apparatus and a browser," the method disclosed includes: reading browsing habit information of a user; in a process that the user browses a current webpage, analyzing a webpage link to be pre-read according to the browsing habit information of the user, pre-reading webpage data corresponding to the webpage link from a server side, and storing the webpage data to a local cache. A pre-reading method disclosed thereby includes: pre-reading one or more webpage links in a position region of content on a webpage that the user often clicks, or recoding keywords on a certain webpage A clicked by the user, and next time the webpage A is opened, pre-reading first few or most webpage links that match the keywords. The disadvantage of such a webpage pre-reading method is evident. If one webpage link or first few webpage links that match the keywords is pre-read, the hit rate to pre-read webpage data for the user is very low, and if multiple webpage links or most webpage links that match the keywords are pre-read, it is necessary to pre-read lots of data and load the data into a local cache, which seriously occupies cache space and even leads to occurrence of insufficient cache space.

Therefore, a new webpage pre-reading method is desired.

SUMMARY

An objective of embodiments of the present disclosure is to provide a webpage pre-reading method, apparatus and a smart terminal device, to improve the above problems. According to some embodiments of the present invention, a webpage pre-reading method is provided. The method may include acquiring information of one or more users accessing multiple webpages within a first period of time; determining click paths through each of which a second webpage is clicked and entered from a first webpage in the multiple webpages and the number of clicks thereof; determining a first confidence value of the click path based on data information obtained in the above steps; making multiple click paths into a first pre-reading list of webpages based on the first confidence values; and querying for a click path of a currently browsed webpage from the first pre-reading list so as to pre-read data of a corresponding target webpage to be browsed.

According to some embodiments, a pre-processing step is included for performing data cleaning on data of each webpage in the process of acquiring information of access of one or more users to multiple webpages within a first period of time. In the step of determining click paths through each of which a second webpage is clicked and entered from a first webpage in the first multiple webpages and the number of clicks thereof, the acquired information of access to the first multiple webpages is first entered into a first webpage access sequence list in an order of the time when each webpage is accessed, the multiple webpages in the first webpage access sequence list are divided into multiple page blocks according to a regular time interval, and a click path, in each page block, through which the second webpage is clicked and entered from the first webpage and the number of clicks thereof are determined, wherein a first attenuation coefficient between the first and second webpages on the click path in each page block is multiplied by the number of clicks of the click path occurring in the page block to obtain the attenuated number of clicks, and the attenuated numbers of clicks of the identical click path in all the page blocks are linearly added, to obtain the final number of clicks of the click path.

According to some other embodiments, the first attenuation coefficient is calculated by: $\exp(-A*(D-1))$, wherein A is a constant, and D is a sorting distance. In some embodiments, click paths that have the number of clicks lower than a first click threshold are filtered out in the process of or before the determining a first confidence value of the click path. According to some embodiments, the first confidence value of the click path is calculated by:

$$NPMI(a,b)=\log_x(p(a,b)/(p(a)*p(b)))/-\log_x(p(a,b));$$

wherein, NPMI(a, b) denotes a first confidence value of a click path a→b through which a second webpage b is clicked and entered from a first webpage a, x is a base number variable, p(a, b) denotes the ratio of the final number of clicks of the click path a→b to the total number of page blocks, p(a) denotes the ratio of the number of page blocks where the first page a is located to the total number of page blocks, and p(b) denotes the ratio of the number of the page blocks where the second page b is located to the total number of page blocks.

In some other embodiments, before the first pre-reading list of webpages is made, click paths that have the first confidence value lower than a first confidence value threshold are first filtered out. In the step of generating a first pre-reading list of click paths based on the first confidence values, the multiple click paths are made into the first pre-reading list of webpages in a manner of orderly arranging first confidence values. In the step of querying for a click path of a currently browsed webpage from the first pre-reading list, so as to pre-read data of a corresponding target webpage to be browsed, when multiple click paths through which multiple target webpages can be clicked and entered from the currently browsed webpage are queried from the first pre-reading list, a click path having the largest first confidence value is selected to pre-read the data of the corresponding target webpage to be browsed, or data of multiple corresponding target webpages to be browsed is pre-read in a descending order of the first confidence values. When a click path through which a target webpage is clicked and entered from the currently browsed webpage is not present in the first pre-reading list, a pre-reading operation is not triggered.

In some embodiments, before the step of querying for a click path of a currently browsed webpage from the first pre-reading list, so as to pre-read data of a corresponding target webpage to be browsed, a second pre-reading list is generated and a click path of the currently browsed webpage is queried from the second pre-reading list, and when the click path is present in the second pre-reading list, the data of the corresponding target webpage to be browsed is pre-read; when the click path is not present in the second pre-reading list, the step of querying for a click path of a currently browsed webpage from the first pre-reading list, so as to pre-read data of a corresponding target webpage to be browsed is performed.

The second pre-reading list may be generated by: acquiring information of access of each user to second multiple webpages within a second period of time which encompasses the first period of time; determining a click path through which another page is clicked and entered from each page in the second multiple webpages and the number of clicks thereof, and analyzing and determining a path click-through rate of each click path and entropy of path click-through rates of multiple click paths through which multiple different pages are clicked and entered from each page; determining a second confidence value of each click path according to the number of clicks of the click path and the entropy of path click-through rates; and making the multiple click paths into a second pre-reading list of webpages based on the second confidence values.

In some embodiments, the method of generating the second list may include performing data cleaning on data of each webpage in the process of acquiring information of access of each user to second multiple webpages within a second period of time which encompasses the first period of time. The time length of the second period of time is greater than or equal to that of the first period of time and the first period of time is within the second period of time. When the second period of time is greater than or equal to one day, in the step of determining a click path through which another page is clicked and entered from each page and the number of clicks thereof, the number of clicks of the click path in every day is multiplied by a corresponding second attenuation coefficient of the click path on the same day to determine the attenuated number of clicks, and the attenuated numbers of clicks of the identical click path in multiple days included in the second period of time are linearly added, to obtain the final number of clicks of the click path occurring within the second period of time.

In some embodiments, click paths that have the number of clicks lower than a second click threshold are filtered out in the process of determining a second confidence value of each click path. In the step of determining a second confidence value of each click path, the number of clicks of the click path is multiplied by the entropy of the path click-through rate of the click path to determine the second confidence value of the click path. Before the second pre-reading list of webpages is made, click paths that have the second confidence value lower than a second confidence value threshold are first filtered out. In the step of making the multiple click paths into a second pre-reading list of webpages based on the second confidence values, the multiple click paths are made into the second pre-reading list of webpages in a manner of orderly arranging second confidence values. When multiple click paths through which multiple target webpages can be clicked and entered from the currently browsed webpage are queried from the second pre-reading list, a click path that has the largest second confidence value is selected to pre-read the data of the corresponding target webpage to be browsed, or data of multiple corresponding target webpages to be browsed is pre-read in a descending order of the second confidence values.

In the embodiments of the present invention, a webpage pre-reading method is further provided. The method may include: acquiring information of access of each user to multiple webpages within one period of time; determining a click path through which another page is clicked and entered from each page in the multiple webpages and the number of clicks thereof, and analyzing and determining a path click-through rate of each click path and entropy of path click-through rates of multiple click paths through which multiple different pages are clicked and entered from each page; determining a confidence value of each click path according to the number of clicks of the click path and the entropy of path click-through rates; making the multiple click paths into a pre-reading list of webpages based on the confidence values; and querying for a click path of a currently browsed webpage from the pre-reading list, so as to pre-read data of a corresponding target webpage to be browsed.

In the embodiments of the present invention, a webpage pre-reading apparatus is further provided. The apparatus may include: a first acquisition module, a first processing module, a first determination module, a first generation module and a first pre-reading module, wherein: the first acquisition module is for acquiring information of access of one or more users to multiple webpages within a first period of time; the first processing module is for determining a click path through which a second webpage is clicked and entered from a first webpage in the multiple webpages and the number of clicks thereof; the first determination module is for determining a first confidence value of the click path based on data information obtained; the first generation module is for making multiple click paths into a pre-reading list of webpages based on the first confidence value; and the first pre-reading module is for querying for a click path of a currently browsed webpage from the pre-reading list so as to pre-read data of a corresponding target webpage to be browsed.

In some embodiments, the apparatus may further include a first pre-processing module for performing data cleaning on the webpage data. In some embodiments, the apparatus may further include a first filtering module for filtering out click paths that have the number of clicks lower than a first click threshold. In some embodiments, the apparatus may further include a second filtering module for filtering out click paths that has the first confidence value lower than a first confidence value threshold.

In the embodiments of the present invention, a webpage pre-reading apparatus is further provided. The apparatus may include: a second acquisition module, a second analysis and processing module, a second determination module, a second generation module and a second pre-reading module, wherein: the second acquisition module is for acquiring information of access of each user to multiple webpages within one period of time; the second analysis and processing module is for determining a click path through which another page is clicked out from each page in the multiple webpages and the number of clicks thereof, and analyzing and determining a path click-through rate of each click path and entropy of path click-through rates of multiple click paths through which multiple different pages are clicked and entered from each page; the second determination module is for determining a second confidence value of each click path according to the number of clicks of the click path and the entropy of path click-through rates; the second generation module is for making the multiple click paths into a pre-reading list of webpages based on the second confidence values; and the second pre-reading module is for querying for a click path of a currently browsed webpage from the pre-reading list, so as to pre-read data of a corresponding target webpage to be browsed.

In some embodiments, the apparatus may further include a second pre-processing module for performing data cleaning on the webpage data. In some embodiments, the apparatus may further include a third filtering module for filtering out click paths that have the number of clicks lower than a second click threshold. In some embodiments, the apparatus may further include a fourth filtering module for filtering out click paths that have the second confidence value lower than a second confidence value threshold.

In the embodiments of the present invention, a smart terminal device is further provided, including the webpage pre-reading apparatus as described above.

The webpage pre-reading method, apparatus and the smart terminal device according to the embodiments of the present invention have the following beneficial effects: a confidence value of a click path is obtained by making statistics on the number of clicks of the click path, the hit probability of pre-reading webpage data for a user in advance according to a pre-reading list made based on the confidence value is greatly increased, thus ensuring high accuracy and high effectiveness of pre-reading, and after high-probability webpage data is pre-read and stored to a local cache, the speed at which the user opens a webpage is improved and user experience is enhanced.

DETAILED DESCRIPTION

The technical solutions in the embodiments of the present invention will be clearly and completely described below with reference to the accompanying drawings in the embodiments of the present invention. It is obvious that the embodiments to be described are only some rather than all of the embodiments of the present invention. Generally, the components of the embodiments of the present invention described and illustrated in the accompanying drawings herein can be arranged and designed with various different configurations. Therefore, the following detailed description about the embodiments of the present invention provided in the accompanying drawings is not intended to limit the claimed scope of the present invention, but merely indicates chosen embodiments of the present invention. All other embodiments derived by persons of ordinary skill in the art based on the embodiments of the present invention without carrying out creative activities should fall within the protection scope of the present invention.

The technical solutions of the present invention will be clearly and completely described below with reference to the accompanying drawings and specific embodiments of the present invention.

Figure 1:
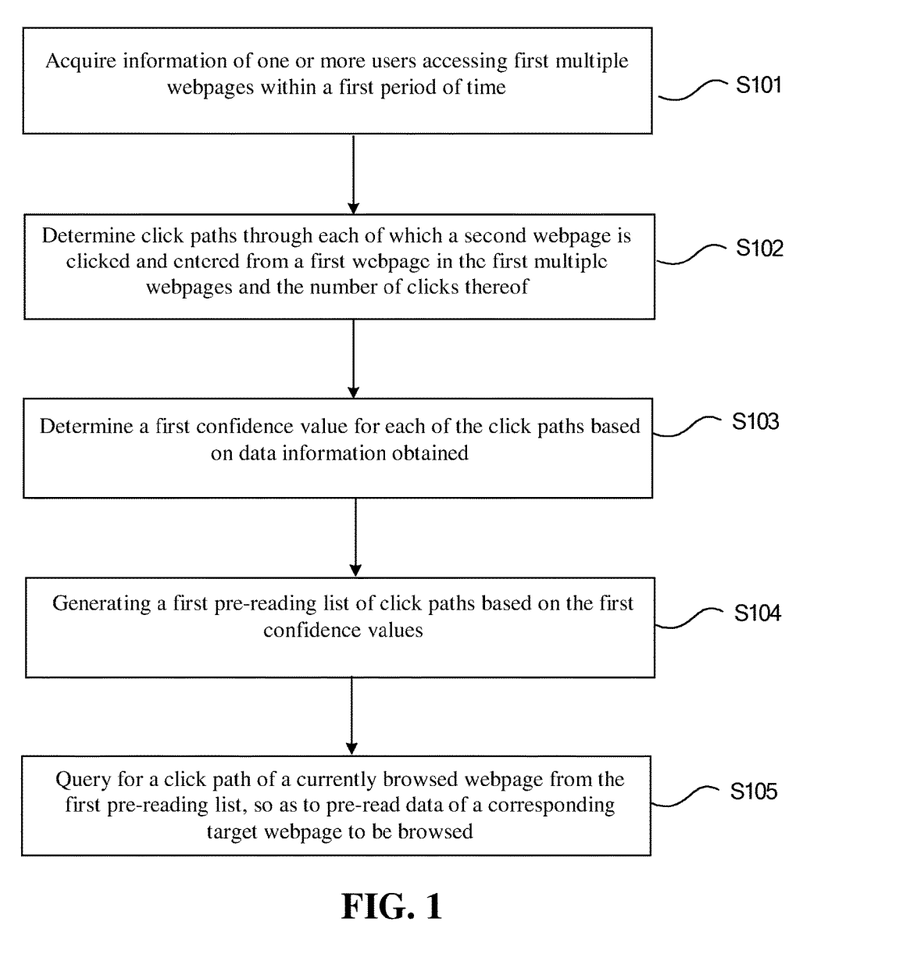
FIG. 1 is a flow chart of a webpage pre-reading method according to the present invention.

FIG. 1 is a flow chart of a webpage pre-reading method according to some embodiments of the present disclosure. As shown in FIG. 1, in an embodiment of the present invention, a webpage pre-reading method is provided. The method includes: Step S101: acquiring information on one or more users accessing a first set of multiple webpages within a first period of time.

The information on one or more users accessing a first set of multiple webpages within a first period of time may be acquired in a manner of reading a client terminal's Internet-surfing record log of network accesses of a terminal device of the users, and may also be acquired in a manner of reading an Internet-surfing record log of accesses to webpages stored by a server. Moreover, if page views of each page are not recorded in the log, it is also feasible to, after information of all webpages is acquired, calculate statistics on page views of each webpage, time distribution and the like. There may be one or more users. Generally, information on multiple non-specific users accessing multiple webpages within a first period of time is preferably acquired in the manner of reading an Internet-surfing record log of accesses to the webpages stored by a server. Information content recorded in the log is known to persons skilled in the art, which is not illustrated herein. Similarly, the method of recording and acquiring a user's accessing the Internet and browsing a webpage may be any well-known method, for example, disclosed in a Chinese patent document disclosed on Dec. 11, 2013 with the Application Number of 201310364722.0 and entitled "A Method for Recording and Reading User Operation Log Information," and for another example, a Chinese patent document disclosed on Apr. 15, 2015 with the Application Number of 201510038747.0 and entitled "A Method and System for Generating Internet Access Record of Mobile User." It is feasible to acquire information of all webpages accessed by one or more users within a first period of time. The first period of time may be set according to an actual application situation. For example, where access situations of multiple users are to be acquired, the first period of time may be set as multiple hours, for example, 12 hours, 24 hours, 30 hours, 36 hours and so on; when access situations of one user are to be acquired, the first period of time may be set as multiple hours and may also be set as multiple days, for example, 5 days, 7 days, 10 days, 15 days and so on.

In another embodiment, the method further includes a step of pre-processing data of each webpage in the process of acquiring information on one or more users accessing a first set of multiple webpages within a first period of time. The pre-processing step may include data cleaning. In general, a significant amount of information may be recorded in both an Internet-surfing record log stored by a client terminal and an Internet-surfing record log stored by a server, which includes non-network request data, non-standard data and non-main document request data and inconsistent irrelevant data. For example, log data may include user IP addresses, user IDs, URLs requested to be accessed, request methods, access time, transmission protocols, the number of bytes transmitted, error codes, user agent and other attributes. One webpage browsing request of the user may cause the browser to automatically download multiple files, for example, some images and so on, and all the downloaded files form a webpage view, which makes up a situation where one request corresponds to multiple log entries.

Thus, the method may include first performing pre-processing of data cleaning on data recorded in the log, and clear irrelevant data from the data recorded in the log. For example, clear URL extensions: in a general information website, only the text of a webpage is relevant to a user request, while image type webpage requests (the suffixes are gif, jpg and the like) and script type files (files with the suffixes of js, cgi and css) on the webpage can be considered to be irrelevant to the user request and can be deleted. Under normal circumstances, the user may not specify a request for all images and script files on a certain webpage, the images and the script files in the log are mostly image information carried in a webpage of script content for configuring a webpage framework, the images and the script files are automatically downloaded as subsidiary files when the user browses text content of the webpage, and the images and the script files cannot really reflect the user's request behavior and will be deleted in the process of data cleaning.

Data irrelevant to the user request is cleared through a technical measure of data cleaning, and reliable and accurate data suitable for subsequent statistics and analysis operations is obtained, helpful for obtaining accurate statistics and analysis results and reducing the computation amount of data.

Step S102: determining a click path through which a second webpage is clicked and entered from a first webpage in the first set of multiple webpage and the number of clicks thereof.

In general, after a certain webpage is opened through, for example, a PC browser or a smart terminal browser and other various browsers, various elements constituting the webpage may be displayed in a browser interface, which, for example, may include texts, images, audio, video and other content and may also include links to such common webpage elements. A visitor can automatically jump to a linked target by clicking a link on the webpage, which is generally another webpage. A variety of information of various webpages browsed by the user through a browser may be recorded in a client Internet-surfing record log of network accesses of all terminal devices, for example, access time (including access starting time and access end time), URL addresses, transmitted content types and the like. For ease of distinction, it is feasible to refer to one webpage corresponding to a link as next webpage or a target webpage, refer to a webpage that includes the link in webpage content thereof as a current webpage or a source webpage, and a click path is a path through which another webpage (target webpage) is clicked and entered from a current webpage (source webpage); generally, the tail of the path is the current webpage (source webpage), and the head of the path is the another webpage (target webpage) clicked out by the user. Therefore, the determining a click path through which a second webpage is clicked and entered from a first webpage in the multiple webpages is determining a click path through which the user clicks and enters (accesses) a target webpage from a source webpage.

When the user clicks and enters (accesses) the second webpage from the first webpage multiple times at different time intervals within a first period of time, the number of clicks of the click path through which the second webpage is clicked and entered (accessed) from the first webpage is recorded.

For example, if the number of clicks that a user clicks and enters a sports section webpage (the second webpage) from, for example, an information center webpage (the first webpage) on the home page of a UC browser at different time points within 12 hours is 3, the number of clicks that the user clicks and enters an entertainment section webpage is 6 and the number of clicks that the user clicks and enters a finance and economics section webpage is 4, then a click path is formed from the information center webpage to the sports section webpage, and the number of clicks of the click path is 3; a click path is formed from the information center webpage to the entertainment section webpage, and the number of clicks of the click path is 6; and a click path is formed from the information center webpage to the finance and economics section webpage, and the number of clicks of the click path is 4.

In operation, multiple click paths may be generated from one webpage (source webpage). In other words, multiple webpages (target webpages) may be clicked and entered, and these multiple webpages (target webpages) may be click-opened following a sequential order in access time. The sequential order in which the user clicks the webpages reflects to some extent an order of webpages which the user most hopes to browse. That is, it reflects the extent of interest the user has on the linked webpages. The content that the user is most interested in is browsed first, and then the content that the user is generally interested in is browsed. Therefore, in order to further increase the hit probability of pre-reading webpage data for the user in advance, when the number of clicks of the click path is determined, the factor of access order into account may also be considered.

According to some other embodiments of the present disclosure, the acquired access information the multiple webpages is listed in a first webpage access sequence list in an order of the time when each webpage is accessed. For example, a first webpage is ranked in the first place in the first webpage access sequence list, and 3 target webpages are clicked and entered respectively from the first webpage, then the 3 target webpages are respectively ranked in the second to fourth places according to a sequential click order. A sorting distance between two adjacent webpages in the first webpage access sequence list is 1, and the sorting distance is increased by 1 for every additional webpage element. Accordingly, according to the access order, the user's interest attenuates, and a method of calculating the first attenuation coefficient is: $\exp(-A*(D-1))$, wherein A is a constant, and D is a sorting distance. According to empirical values of multiple experiments, A may be $\log_2 3$.

In consideration of the attenuation factor, the number of clicks occurring on one click path multiplied by the first attenuation coefficient of the click path is used as the final number of clicks of the click path. It can be known from the calculation formula of the first attenuation coefficient that, when the sorting distance is 1, the first attenuation coefficient is equal to 1, and at this point, it is feasible to consider that the number of clicks of the click path is not attenuated.

In operation, the time length of the first period of time may be longer, for example, 1 day, 3 days, 5 days, 7 days and the like. The user may click a link on a page A to browse a page B on Day 1, repeatedly click the click on the page A to browse the page B on Day 2, and the same is true for Day 3. If, in the process of making the first webpage access sequence list, path information from page A→page B occurring 3 times in the 3 days is respectively recorded in the first webpage access sequence list, it may cause computational complexity. One method may be recording the path information from page A→page B occurring 3 times once in the first webpage access sequence list but recording the number of times and time of occurrence at the same time; however, such a method may also cause computational complexity when accurate statistics is made on the number of clicks of click paths occurring when the user accesses webpages and the attenuation factor is taken into account.

To this end, the present disclosure provides another preferred embodiment. In the preferred embodiment, the acquired information of accessing the first set of multiple webpages is listed in a first webpage access sequence list in an order of the time when each webpage is accessed. The multiple webpages in the first webpage access sequence list are divided into multiple page blocks according to a regular time interval, and a click path, in each page block, through which the second webpage is clicked and entered from the first webpage and the number of clicks thereof are determined, wherein a first attenuation coefficient between the first and second webpages on the click path in each page block is multiplied by the number of clicks of the click path occurring in the page block to obtain the attenuated number of clicks, and the attenuated numbers of clicks of the identical click path in all the page blocks are linearly added, to obtain the final number of clicks of the click path.

For example, the first period of time is set to be 6 hours, and information of webpages that the user accesses is divided into 6 page blocks 1-6 according to, for example, a time interval of 1 hour. For the sake of simplicity of description, suppose that the page block 1 includes 5 page elements [s1,s2,s3,s4,s5], the page elements are orderly arranged according to user access time, suppose that the click paths are s1→s2, s1→s3, s1→s5, s2→s4 and s4→s5 and the number of clicks of identical click paths is 1, and whether or not the number of clicks of a click path is attenuated is considered according to a sorting distance between two webpages, that is, a source webpage and a target webpage, on the click path in the page block 1, wherein the sorting distance between the two webpages, the source webpage and the target webpage, on the click path is 1. It indicates that the click path is a click path occurring when the user first accesses the webpage. It is also feasible to consider that the target webpage of the click path is the content that the user is most interested in, and the first attenuation coefficient is 1, and thus the number of clicks of the click path is not attenuated; moreover, when the sorting distance between the two webpages, the source webpage and the target webpage, on the click path is greater than 1, as the click path in the first webpage access sequence list is sorted according to a sequential order of access time, which reflects how the user is interested in the browsed webpage, the number of clicks of the click paths on which the sorting distance between the two webpages, the source webpage and the target webpage, is greater than 1 is attenuated. A sorting distance between two adjacent webpages in the page block is 1, and the sorting distance is increased by 1 for every additional webpage element. For example, a sorting distance between s1 and s2 is 1 and is not attenuated, while a sorting distance between s1 and s3 is 2, a sorting distance between s1 and s5 is 4, a sorting distance between s2 and s4 is 2, and the attenuation factor should be taken into account.

A method of calculating the first attenuation coefficient is: $\exp(-A*(D-1))$, wherein A is a constant, and D is a sorting distance. According to empirical values of multiple experiments, A may be $\log_2 3$.

In consideration of the attenuation factor, the number of clicks of one click path in one page block is the number of clicks of the click path occurring in the page block multiplied by the first attenuation coefficient of the click path in the page block. With the above method, by calculating the attenuated numbers of clicks of the click path in all page blocks and then linearly adding the attenuated numbers of clicks, it is feasible to obtain the final number of clicks of the click path occurring within the first period of time (for example, 6 hours) determined above.

Step S103: determining a first confidence value of the click path based on data information obtained in the above steps.

The first confidence value may be calculated with a well-known confidence value calculation method, and the method of calculating the first confidence value under normal circumstances is not described in detail herein.

In the above preferred scheme of utilizing the first webpage access sequence list and dividing it into N page blocks, the method of determining a first confidence value of the click path employed in the present disclosure includes:

$$NPMI(a,b)=\log_x(p(a,b)/(p(a)*p(b))/-\log_x(p(a,b)) \quad (1)$$

The formula is a function expression, wherein, NPMI(a, b) denotes a first confidence value of a click path a→b through which a second webpage b is clicked and entered from a first webpage a, x is a base number variable, p(a, b) denotes the ratio of the final number of clicks of the click path a→b to the total number of page blocks, p(a) denotes the ratio of the number of page blocks where the first page a is located to the total number of page blocks, and p(b) denotes the ratio of the number of page blocks where the second page b is located to the total number of page blocks.

For example, the first webpage access sequence list is divided into 10 page blocks, wherein, if the click path a→b is present in 4 page blocks and the final number of clicks of the click path a→b in the first webpage access sequence list is 4, p(a, b)=4/10=0.4, if the first page a is present in 9 page blocks, p(a)=9/10=0.9, and if the second page b is present in 7 page blocks, p(b)=7/10=0.7.

The first confidence value of the click path is calculated, which is for indicating the possibility that the user clicks and enters the second webpage b from the first webpage a, which well describes correlation between two pages.

In addition, in the above formula (1) for calculating the first confidence value, what value the base number variable x of the logarithm log is is not the most important for the present disclosure, because, no matter what value the base number variable x is, trends of curves drawn according to the obtained first confidences of different click paths are all the same.

In another embodiment, click paths that have the number of clicks lower than a first click threshold are filtered out in the process of or before the determining a first confidence of the click path, that is, the first confidence of the click path is not calculated.

The first click threshold may be determined according to an actual application situation. For example, when one period of time during which a webpage accessed by users is collected is set to be a different value, for example, 12 hours, 24 hours, 30 hours or 5 days, 7 days, 10 days or the like, the first click threshold may be correspondingly set to be a different value. When the number of users accessing the webpage collected is different, the first click threshold may be correspondingly set to be a different value.

Step S104: making multiple click paths into a first pre-reading list of webpages based on the first confidence values.

Multiple click paths are made into a first pre-reading list of webpages, and the multiple click paths in the first pre-reading list may be arranged in order. After step S103, each click path has a first confidence, and it is feasible to make multiple click paths into a first pre-reading list of webpages in a manner of sorting sizes of the first confidence values, that is, the multiple click paths in the first pre-reading list may be arranged in order according to the sizes of the first confidence values.

In another preferred embodiment, if there is a large number of click paths obtained through statistics, it is feasible to first filter out click paths that have low first confidence values, to reduce the computation amount of data, and it is also feasible to avoid pre-reading webpage data that users may not browse and loading the webpage data into a local cache, thus saving occupation of cache space resource. It is feasible to, according to empirical values, preset a first confidence threshold and filter out click paths that have first confidence values lower than the first confidence value threshold. In order to reduce the computation amount of data, it is feasible to, before the first pre-reading list is made, first filter out the click paths that have first confidence values lower than the first confidence value threshold.

Step S105: querying for a click path of a currently browsed webpage from the first pre-reading list, so as to pre-read data of a corresponding target webpage to be browsed.

When the user browses a current webpage or a first webpage, a click path that uses the currently browsed webpage or the first webpage as a source webpage is queried from the first pre-reading list. When multiple click paths through which multiple target webpages can be clicked and entered from the currently browsed webpage or the first webpage are present in the first pre-reading list, it is feasible to select a click path that has the largest first confidence to pre-read data of a corresponding target webpage to be browsed and load the data into a local cache; in order to ensure the accuracy of pre-reading the target webpage, it is also feasible to pre-read data of multiple corresponding target webpages to be browsed in a descending order of the first confidence values and load the data into a local cache, for example, 2, 3, 4 or more target webpages are pre-read.

In addition, when a click path through which a target webpage is clicked out from the currently browsed webpage is not present in the first pre-reading list, that is, no pre-read webpage is present, a pre-reading operation is not triggered, and corresponding webpage information is acquired from a network server when the user clicks next webpage.

If the user does not request a new webpage but directly stops browsing a webpage, for example, the user closes the browser, pre-read webpage data is released, avoiding that pre-read webpage data not used occupies a large number of local cache resources.

The webpage pre-reading method according to the embodiment of the present disclosure has the following beneficial effects: a confidence value of a click path is obtained by making statistics on the number of clicks of the click path, the hit probability of pre-reading webpage data for a user in advance according to a pre-reading list made based on the confidence is greatly increased, thus ensuring high accuracy and high effectiveness of pre-reading, and after high-probability webpage data is pre-read and stored to a local cache, the speed at which the user opens a webpage is improved and user experience is enhanced.

Figure 2:
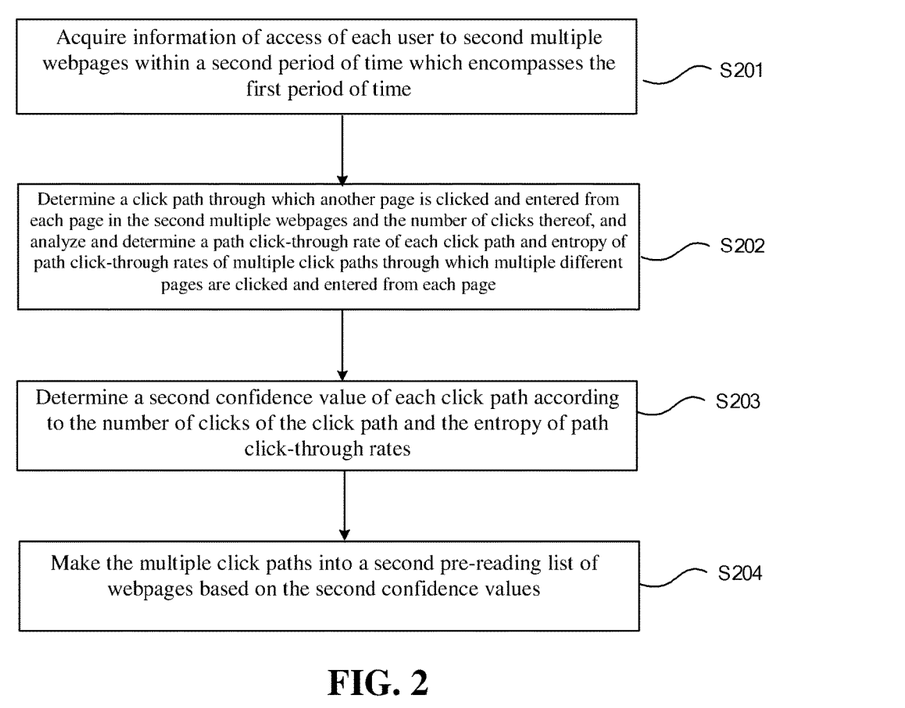
FIG. 2 is a flow chart of generating a second pre-reading list in the webpage pre-reading method according to the present invention.

In order to further increase the hit probability of pre-reading webpage data for the user in advance and ensure high accuracy and high effectiveness of pre-reading, a factor of frequency at which a certain click path is generated when each user browses a webpage within one period of time can be taken into account; to this end, the embodiments of the present invention may further provide a method of generating a second pre-reading list in the webpage pre-reading method as shown in FIG. 2.

In one embodiment, a click path of a currently browsed webpage is queried from a first pre-reading list, so that before the step of pre-reading data of a corresponding target webpage to be browsed, a second pre-reading list is made and a click path of the currently browsed webpage is queried from the second pre-reading list, and when the click path is present in the second pre-reading list, the data of the corresponding target webpage to be browsed is pre-read; when the click path is not present in the second pre-reading list, the step of querying for a click path of a currently browsed webpage from the first pre-reading list, so as to pre-read data of a corresponding target webpage to be browsed is performed, and the method of making a second pre-reading list includes:

step S201: acquiring information of access of each user to second multiple webpages within a second period of time which encompasses the first period of time;

step S202: determining a click path through which another page is clicked and entered from each page in the second multiple webpages and the number of clicks thereof, and analyzing and determining a path click-through rate of each click path and entropy of path click-through rates of multiple click paths through which multiple different pages are clicked out from each page;

step S203: determining a second confidence of each click path according to the number of clicks of the click path and the entropy of path click-through rates; and step S204: making the multiple click paths into a second pre-reading list of webpages based on the second confidences.

The priority of the second pre-reading list is higher than that of the first pre-reading list.

The meaning of a second period of time which encompasses the first period of time is that: the time length of the second period of time is greater than or equal to that of the first period of time and the first period of time is within the second period of time.

The method of acquiring information of a webpage accessed by a user and the method of determining a click path through which another page is clicked and entered from each page in the second multiple webpages and the number of clicks thereof are the same as those that have been described in detail above, including pre-processing of data cleaning and the like, which are not repeated herein.

The path click-through rates of the click paths are ratios of the number of clicks another webpage is clicked and entered from one webpage within the second period of time to the number of times all different webpages are clicked and entered from the one webpage.

The entropy of path click-through rates of multiple click paths through which multiple pages are clicked and entered from each page indicates the distribution of the path click-through rates.

An example is provided below. Assuming that the second period of time is 7 days, statistics is made on the number of clicks of a click path a→b through which a user clicks and enters a second webpage b from a first webpage a within the 7 days. Assuming that the user clicks and enters three different webpages from the first webpage a within 7 days, which are a second webpage b, a third webpage c and a fourth webpage d respectively, 3 click paths a→b, a→c and a→d are generated, and assuming that the number of clicks of the 3 click paths correspond to n, m and k respectively, the path click-through rate of the click path a→b is n/(n+m+k), the path click-through rate of the click path a→c is m/(n+m+k), and the path click-through rate of the click path a→d is k/(n+m+k).

It is feasible to calculate the entropy of path click-through rates of multiple click paths through which multiple different pages are clicked out from each page with a well-known entropy calculation method.

The method of determining a second confidence of each click path is multiplying the number of clicks of the click path by the entropy of the path click-through rate of the click path.

In another embodiment, as stated above, when the second period of time is multiple days, the attenuation factor is preferably taken into account. It is feasible to make statistics on the number of clicks of the click path in a manner described above. For example, statistics is made respectively on the number of clicks of click paths accessed by one user every day within the second period of time, and a method of calculating the second attenuation coefficient is: $\exp(-A^*(Day-1))$, wherein A is a constant, and Day is the number of days included in the second period of time. According to empirical values of multiple experiments, A may be $\log_2 3$. Similar to the principle described above, the attenuation factor should be taken into account for the number of clicks of click paths obtained through statistics within multiple days before the day. Assuming that, when statistics is made on the number of clicks of a click path on the day, Day=1, that is, the day is 1 day, then the second attenuation coefficient is equal to 1, and at this point, it is feasible to consider that the number of clicks of the click path is not attenuated. When statistics is made on the number of clicks of a click path on the previous day before the day, Day=2, the rest can be done in the same manner, Day=3 . . . Day=7, then the second attenuation coefficient is not 1, and the attenuation factor should be taken into account when statistics is made on the number of clicks of the click path. A specific method is as follows: the number of clicks of one click path within one day is the number of clicks of the click path occurring within the day multiplied by a corresponding second attenuation coefficient of the click path on the day. The corresponding number of clicks of the click path in multiple days included in the second period of time is calculated respectively using the method, then the number of clicks is linearly added, and the final number of clicks of the click path occurring within the second period of time (for example, 7 days) can be obtained.

In the step of determining a second confidence value of the click path, by multiplying the number of clicks of the click path obtained above by the entropy of the path click-through rate of the click path, the product value obtained is the second confidence value of the click path.

In another embodiment, in the process of determining the second confidence of the click path, click paths that have a number of clicks lower than a second click threshold are filtered out, that is, the second confidence of the click path is not calculated.

The second click threshold may be determined according to an actual application situation. For example, when one period of time during which webpage access by users collected is set to be a different value, for example, 30 hours or 5 days, 7 days, 10 days or the like, the second click threshold may be correspondingly set to be a different value.

The process of making the multiple click paths into a second pre-reading list of webpages based on the second confidences value is similar to the process of making a first pre-reading list of webpages described above. The multiple click paths are made into a second pre-reading list of webpages, and the multiple click paths in the second pre-reading list may be arranged in order. After step S203, each click path has a second confidence value, and it is feasible to make multiple click paths into a second pre-reading list of webpages in a manner of sorting sizes of the second confidence values, that is, the multiple click paths in the second pre-reading list may be arranged in order according to the sizes of the second confidence values.

In another embodiment, if there is a large number of click paths obtained through statistics, it is feasible to first filter out click paths that have low second confidence values, to reduce the computation amount of data, and it is also feasible to avoid pre-reading webpage data that users may not browse and loading the webpage data into a local cache, thus saving occupation of cache space resource. It is feasible to, according to empirical values, preset a second confidence value threshold and filter out click paths that have second confidence values lower than the second confidence value threshold. In order to reduce the computation amount of data, it is feasible to, before the second pre-reading list is made, first filter out the click paths that have second confidence values lower than the second confidence value threshold.

Therefore, the priority of the second pre-reading list is set to be higher than that of the first pre-reading list; so, when the user browses a current webpage or a first webpage, a click path that uses the currently browsed webpage or the first webpage as a source webpage is queried preferentially from the second pre-reading list. When multiple click paths through which multiple target webpages can be clicked and entered from the currently browsed webpage or the first webpage are present in the second pre-reading list, it is feasible to select a click path that has the largest second confidence value to pre-read data of a corresponding target webpage to be browsed and load the data into a local cache; in order to ensure the accuracy of pre-reading the target webpage, it is also feasible to, in a descending order of the second confidences, pre-read data of multiple corresponding target webpages to be browsed and load the data into a local cache, for example, 2, 3, 4 or more target webpages are pre-read.

The beneficial effects of the embodiments of the present invention are as follows: a user's own interest is judged at first, and the hit probability of pre-reading webpage data for the user in advance can be increased, thus ensuring high accuracy and high effectiveness of pre-reading.

In addition, when a click path through which a target webpage is click-opened from the currently browsed webpage is not present in the second pre-reading list, that is, no pre-read webpage is present, the first pre-reading list is queried next, and when the click path through which a target webpage is click-opened from the currently browsed webpage is present in the first pre-reading list, the target webpage is pre-read according to the method of selecting a click path from the first pre-reading list described above; when the click path through which a target webpage is clicked out from the currently browsed webpage is not present in the first pre-reading list, either, a pre-reading operation is not triggered, and corresponding webpage information is acquired from a network server when the user clicks next webpage.

The webpage pre-reading method according to the embodiments of the present invention has the following beneficial effects: a factor of frequency at which a certain click path is generated when each user browses a webpage within one period of time is taken into account, that is, a user's own interest is judged first, and a pre-read target webpage is selected therefrom; when no pre-read target webpage is found, a target webpage is pre-read from a high-probability click path usually accessed by one or more users, and next webpage (target webpage) that the user is ready to access from the currently browsed webpage is predicted from two aspects, which evidently increases the hit probability of pre-reading webpage data for the user in advance greatly, thus ensuring high accuracy and high effectiveness of pre-reading, and after high-probability webpage data is pre-read and stored to a local cache, the speed at which the user opens a webpage is improved and user experience is enhanced.

In summary, the present invention provides multiple embodiments, which, through any combination of various preferred embodiments, can ensure high accuracy and high effectiveness of pre-reading and enhance user experience.

In addition, although a second webpage pre-reading method is introduced with preferred embodiments in the present invention, persons skilled in the art should appreciate that the second webpage pre-reading method may also exist alone as an independent pre-reading technical solution.

Figure 3:
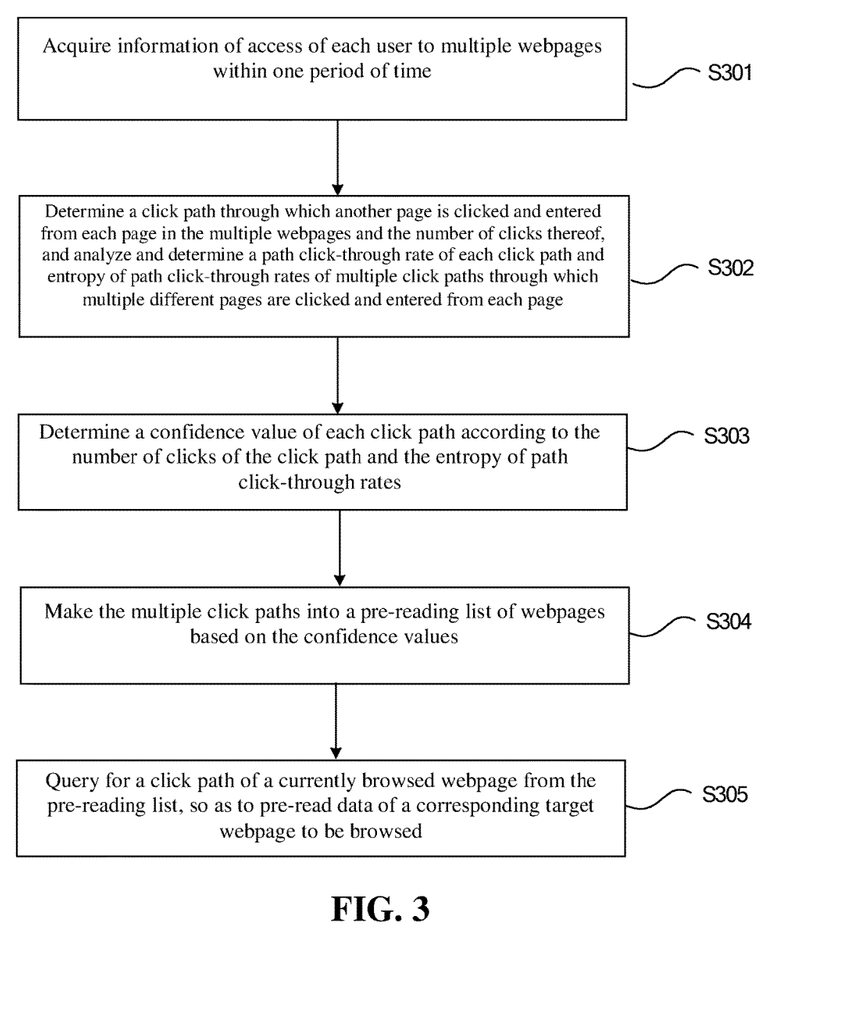
FIG. 3 is a flow chart of another webpage pre-reading method according to the present invention.

FIG. 3 is a flow chart of another webpage pre-reading method according to another embodiment of the present invention. The independent pre-reading technical solution is described briefly below with reference to FIG. 3, that is, a webpage pre-reading method, which includes:

step S301: acquiring information of each user accessing multiple webpages within one period of time;

step S302: determining a click path through which another page is clicked and entered from each page in the multiple webpages and the number of clicks thereof, and analyzing and determining a path click-through rate of each click path and entropy of path click-through rates of multiple click paths through which multiple different pages are clicked and entered from each page;

step S303: determining a confidence of each click path according to the number of clicks of the click path and the entropy of path click-through rates;

step S304: entering the multiple click paths into a pre-reading list of webpages based on the confidences; and step S305: querying for a click path of a currently browsed webpage from the pre-reading list to pre-read data of a corresponding target webpage to be browsed.

The implementation mode of each step, preferred implementation methods and combinations of various preferred embodiments are the same as or similar to the process of the webpage pre-reading method described above with reference to FIG. 1 and/or FIG. 2, for example, first pre-processing of data cleaning, attenuation of the number of clicks of the click path in time, the method of determining the number of clicks, the method of determining a confidence value of the click path, various filtering processing and so on, which are not repeated herein. Pre-reading data of a corresponding target webpage to be browsed from the pre-reading list according to the current webpage browsed by the user and storing the data into a local cache is the same as or similar to the pre-reading process described above, which is not repeated herein.

Figure 4:
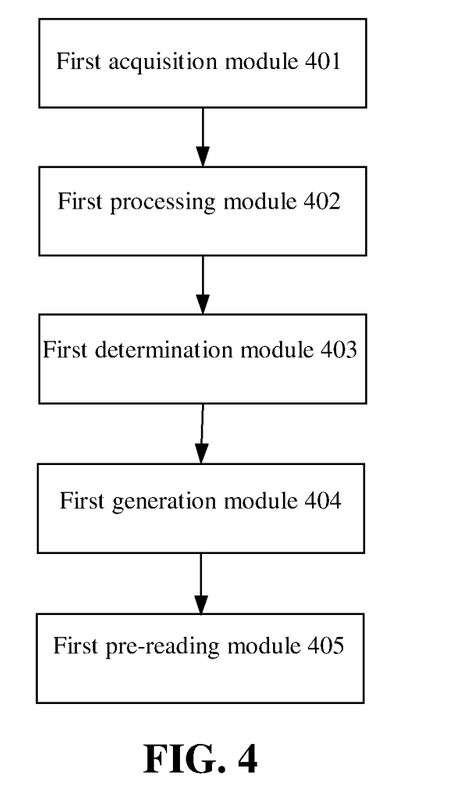
FIG. 4 is a schematic structural diagram of a webpage pre-reading apparatus according to the present invention.

FIG. 4 is a schematic structural diagram of a webpage pre-reading apparatus according to another embodiment of the present invention. As shown in FIG. 4, the webpage pre-reading apparatus includes: a first acquisition module 401, a first processing module 402, a first determination module 403, a first generation module 404 and a first pre-reading module 405, wherein:

the first acquisition module 401 is used for acquiring information of access of one or more users to multiple webpages within a first period of time;

the first processing module 402 is used for determining a click path through which a second webpage is clicked and entered from a first webpage in the multiple webpages and the number of clicks thereof;

the first determination module 403 is used for determining a first confidence of the click path based on data information obtained;

the first generation module 404 is used for making multiple click paths into a pre-reading list of webpages based on the first confidence; and the first pre-reading module 405 is used for querying for a click path of a currently browsed webpage from the pre-reading list so as to pre-read data of a corresponding target webpage to be browsed.

Reference can be made to the description of the corresponding embodiment in FIG. 1 for the specific functions and interaction modes of respective modules in the webpage pre-reading apparatus, which are not repeated herein.

Further, the first acquisition module includes a first pre-processing module, for performing data cleaning on the webpage data.

Figure 5:
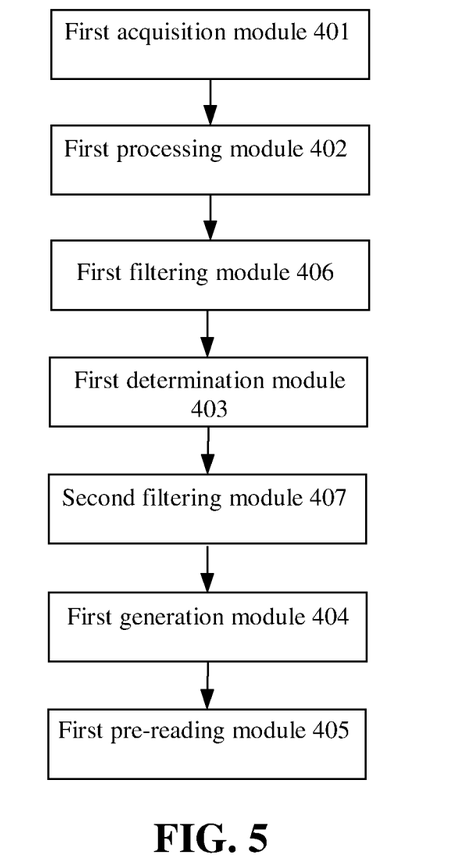
FIG. 5 is a schematic structural diagram of one preferred embodiment of the webpage pre-reading apparatus according to the present invention.

FIG. 5 is a schematic structural diagram of one preferred embodiment of the webpage pre-reading apparatus according to an embodiment of the present invention.

According to one embodiment, the webpage pre-reading apparatus may further include a first filtering module 406, for filtering out click paths that have a number of clicks lower than a first click threshold. According to another embodiment, the webpage pre-reading apparatus may further include a second filtering module 407, for filtering out click paths that have first confidence values lower than a first confidence value threshold.

The webpage pre-reading apparatus according to the embodiment of the present invention has the following beneficial effects: a confidence value of a click path is obtained by making statistics on the number of clicks of the click path, the hit probability of pre-reading webpage data for a user in advance according to a pre-reading list made based on the confidence value is greatly increased, thus ensuring high accuracy and high effectiveness of pre-reading, and after high-probability webpage data is pre-read and stored to a local cache, the speed at which the user opens a webpage is improved and user experience is enhanced.

Figure 6:
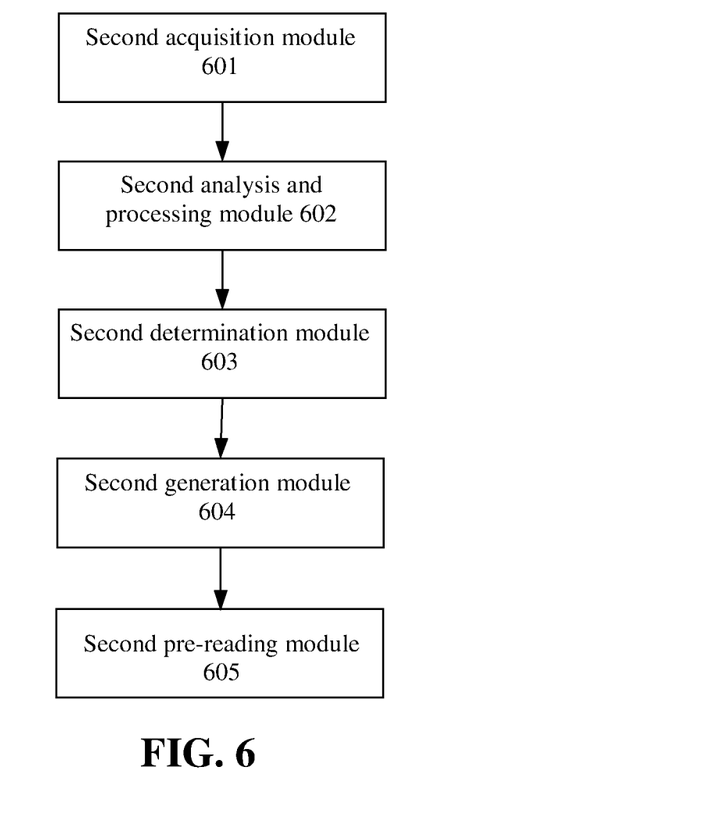
FIG. 6 is a schematic structural diagram of another webpage pre-reading apparatus according to the present invention.

FIG. 6 is a schematic structural diagram of another webpage pre-reading apparatus according to another embodiment of the present invention. As shown in FIG. 6, the webpage pre-reading apparatus includes: a second acquisition module 601, a second analysis and processing module 602, a second determination module 603, a second generation module 604 and a second pre-reading module 605, wherein:

the second acquisition module 601 is used for acquiring information of access of each user to multiple webpages within one period of time;

the second analysis and processing module 602 is used for determining a click path through which another page is clicked out from each page in the multiple webpages and the number of clicks thereof, and analyzing and determining a path click-through rate of each click path and entropy of path click-through rates of multiple click paths through which multiple different pages are clicked and entered from each page;

the second determination module 603 is used for determining a second confidence value of each click path according to the number of clicks of the click path and the entropy of path click-through rates;

the second generation module 604 is used for entering the multiple click paths into a pre-reading list of webpages based on the second confidence values; and the second pre-reading module 605 is used for querying for a click path of a currently browsed webpage from the pre-reading list, so as to pre-read data of a corresponding target webpage to be browsed.

According to a further embodiment, the webpage pre-reading apparatus may include a second pre-processing module, for performing data cleaning on the webpage data.

Figure 7:
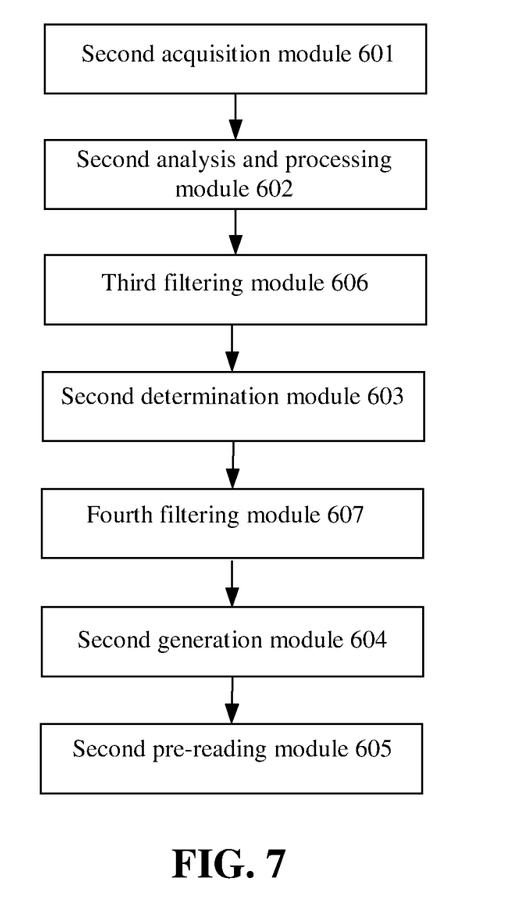
FIG. 7 is a schematic structural diagram of one preferred embodiment of another webpage pre-reading apparatus according to the present invention.

FIG. 7 is a schematic structural diagram of one preferred embodiment of another webpage pre-reading apparatus according to the present invention.

According to one embodiment, the webpage pre-reading apparatus may further include a third filtering module 606, for filtering out click paths of which the number of clicks is lower than a second click threshold. According to another embodiment, the webpage pre-reading apparatus may include a fourth filtering module 607, for filtering out click paths that have second confidence values lower than a second confidence threshold.

Reference can be made to the description of the corresponding embodiment in FIG. 2 or 3 for the specific functions and interaction modes of respective modules in the webpage pre-reading apparatus, which are not repeated herein.

The webpage pre-reading apparatus according to the embodiment of the present invention has the following beneficial effects: a user's own interest is judged first, and the hit probability of pre-reading webpage data for a user in advance can be increased, thus ensuring high accuracy and high effectiveness of pre-reading, and after high-probability webpage data is pre-read and stored to a local cache, the speed at which the user opens a webpage is improved and user experience is enhanced.

A computer program product according to the webpage pre-reading method in the embodiments of the present invention includes a computer readable storage medium where program code is stored, instructions included in the program code can be used for performing the methods described in the previous method embodiments, and reference can be made to the method embodiments for specific implementation thereof, which are not repeated herein.

Persons skilled in the art should appreciate that, for convenient and concise description, reference can be made to the corresponding processes in the previous method embodiments for the specific working processes of the apparatuses described above, which are not repeated herein.

The relational terms such as first and second are merely used to distinguish one entity or operation from another entity or operation, but may not necessarily require or imply that any such an actual relation or order exists between the entities or operations. In addition, the relational terms "first," "second," etc. may be used in different embodiments, in different settings, groups, units, in one embodiment, and they may not refer to the same item. For example, the application refers to a first webpage and a second webpage in different click paths. These terms "first" and "second" are merely used to distinguish one webpage from another webpage in a click path. By referring a "first" webpage in two or more click paths, does not mean they are the same webpage. They may be different webpages.

Moreover, terms "comprise", "include" or any other variations thereof are intended to cover non-exclusive inclusion, so that processes, methods, articles or devices that include a series of elements not only include those elements, but also include other elements not explicitly listed, or further include elements inherent in the processes, methods, articles or devices. Without more restrictions, an element defined by the wording of "including a . . . " does not preclude the further inclusion of other identical elements in the processes, methods, products or devices that include this element.

If the function is implemented in the form of a software functional unit and is sold or used as an independent product, it can be stored in a non-transitory computer-readable storage medium. Based on such an understanding, the technical solution of the present invention or the part that makes contributions to the prior art or the part of the technical solution can be substantially embodied in the form of a software product. The computer software product is stored in a storage medium and includes several instructions to cause a computer device (which may be a personal computer, a server, a network device or the like) to perform all or some steps of the method as described in the embodiments of the present invention. The storage medium includes various mediums that can store program code such as a USB disk, a mobile hard disk, a read-only memory (ROM), a random access memory (RAM), a magnetic disk or an optical disk.

The above descriptions are merely specific implementation modes of the present invention, but the protection scope of the present invention is not limited thereto; variations or replacements that can be easily thought of by any person skilled in the art within the technical scope disclosed in the present invention should be included in the protection scope of the present invention. Therefore, the protection scope of the present invention should be subject to the protection scope of the claims.

What are claimed are:

1. A webpage pre-reading method, comprising:
   acquiring information of one or more users accessing a first set of multiple webpages within a first period of time;
   determining a first set of click paths through each of which a second webpage is clicked and entered from a first webpage in the first multiple webpages and the number of clicks in each click path in the first set of click paths;
   determining a first confidence value for each of the click paths in the first set of click paths;
   generating a first pre-reading list of the first set of click paths based on the first confidence values of the first set of click paths;
   acquiring information of each user accessing a second set of multiple webpages within a second period of time which encompasses the first period of time;
   determining a second set of click paths through each of which a third webpage is clicked and entered from each webpage in the second multiple webpages and the number of clicks in each click path in the second set of click paths;
   determining a path click-through rate of each click path in the second set of click paths;
   determining an entropy of each path click-through rate of a set of multiple click paths through which multiple different webpages are clicked and entered from each webpage;
   determining a second confidence value of each click path in the second set of click paths according to the number of clicks of each click path and the entropy of each path click-through rate;
   generating a second pre-reading list of the second set of click paths based on the second confidence values; and
   querying for a current click path of a currently browsed webpage from either the first pre-reading list or the second pre-reading list, to pre-read data of a corresponding target webpage to be browsed.

2. The webpage pre-reading method according to claim 1, further comprising: a pre-processing step of performing data cleaning on data of each webpage of the multiple webpages in the process of acquiring information of one or more users accessing the multiple webpages within a first period of time.

3. The webpage pre-reading method according to claim 1, wherein the step of determining a first set of click paths through each of which a second webpage is clicked and entered from a first webpage in the first multiple webpages and the number of clicks in each click path in the first set of click paths comprises:
   generating a first webpage access sequence list including the acquired information of accessing the first multiple webpages in an order of the time when each webpage is accessed;
   dividing the first multiple webpages in the first webpage access sequence list into multiple page blocks according to a regular time interval; and
   determining a click path in the first set of click paths, in each page block, through which a second webpage is clicked and entered from a first webpage and the number of clicks thereof, wherein a first attenuation coefficient between the first and second webpages on the click path in the first set of click paths in each page block is multiplied by the number of clicks of the click path in the first set of click paths occurring in the page block to obtain the attenuated number of clicks, and the attenuated numbers of clicks of a set of identical click paths in all the page blocks are linearly added, to obtain the final number of clicks of the click path in the first set of click paths.

4. The webpage pre-reading method according to claim 3, wherein the first attenuation coefficient is calculated by: $\exp(-A*(D-1))$, wherein A is a constant, and D is a sorting distance.

5. The webpage pre-reading method according to claim 1, further comprising: filtering out click paths of which the number of clicks is lower than a first click threshold.

6. The webpage pre-reading method according to claim 1, further comprising: the first confidence value for each click path is calculated by:

$$NPMI(a,b)=\log_x(p(a,b)/(p(a)*p(b)))/-\log_x(p(a,b));$$

wherein, NPMI(a, b) denotes a current first confidence value of a current click path a→b through which a current second webpage b is clicked and entered from a current first webpage a, x is a base number variable, p(a, b) denotes the ratio of the final number of clicks of the current click path a→b to the total number of page blocks, p(a) denotes the ratio of the number of page blocks where the current first webpage a is located to the total number of page blocks, and p(b) denotes the ratio of the number of the page blocks where the current second webpage b is located to the total number of page blocks.

7. The webpage pre-reading method according to claim 1, further comprising: filtering out click paths that have first confidence values lower than a first confidence value threshold.

8. The webpage pre-reading method according to claim 1, wherein generating the first pre-reading list of the first set of click paths based on the first confidence values of the first set of click paths comprises generating the first pre-reading list of the first set of click paths based on an order of the first confidence values of the first set of click paths.

9. The webpage pre-reading method according to claim 1, wherein querying for the current click path of the currently browsed webpage from the first pre-reading list or the second pre-reading list to pre-read data of the corresponding target webpage to be browsed comprises:
when multiple click paths through which multiple target webpages can be clicked and entered from the currently browsed webpage are queried from the first pre-reading list and the second pre-reading list, selecting the current click path with a largest first confidence value to pre-read the data of the corresponding target webpage to be browsed.

10. The webpage pre-reading method according to claim 1, wherein querying for the current click path of the currently browsed webpage from the first pre-reading list or the second pre-reading list to pre-read data of the corresponding target webpage to be browsed comprises:
when multiple click paths through which multiple target webpages can be clicked and entered from the currently browsed webpage are queried from the first pre-reading list and the second pre-reading list, pre-reading data of multiple corresponding target webpages to be browsed in a descending order of the first confidence values.

11. The webpage pre-reading method according to claim 1, further comprising:
querying for the current click path of the currently browsed webpage from the second pre-reading list, wherein:

when the current click path is present in the second pre-reading list, pre-reading the data of the corresponding target webpage to be browsed;
when the current click path is not present in the second pre-reading list, performing the step of querying for the current click path of the currently browsed webpage from the first pre-reading list to pre-read data of a corresponding target webpage to be browsed.

12. The webpage pre-reading method according to claim 11, further comprising: when the second period of time is greater than or equal to one day, in the step of determining the second set of click paths through which the third page is clicked and entered from each page and the number of clicks thereof, multiplying the number of clicks of each click path in the second set of click paths in every day by a corresponding second attenuation coefficient of each click path on the same day to determine the attenuated number of clicks, and linearly adding the attenuated numbers of clicks of each identical click path in multiple days included in the second period of time, to obtain the final number of clicks of each click path occurring within the second period of time.

13. A non-transitory computer-readable storage medium configured with instructions executable by one or more processors to cause the one or more processors to perform operations comprising:
acquiring information of one or more users accessing a first set of multiple webpages within a first period of time;
determining a first set of click paths through each of which a second webpage is clicked and entered from a first webpage in the first multiple webpages and the number of clicks in each click path in the first set of click paths;
determining a first confidence value for each of the click paths in the first set of click paths;
generating a first pre-reading list of the first set of click paths based on the first confidence values of the first set of click paths;
acquiring information of each user accessing a second set of multiple webpages within a second period of time which encompasses the first period of time;
determining a second set of click paths through each of which a third webpage is clicked and entered from each webpage in the second multiple webpages and the number of clicks in each click path in the second set of click paths;
determining a path click-through rate of each click path in the second set of click paths;
determining an entropy of each path click-through rate of a set of multiple click paths through which multiple different pages are clicked and entered from each webpage;
determining a second confidence value of each click path in the second set of click paths according to the number of clicks of each click path and the entropy of each path click-through rate;
generating a second pre-reading list of the second set of click paths based on the second confidence values; and
querying for a current click path of a currently browsed webpage from either the pre-reading list or the second pre-reading list to pre-read data of a corresponding target webpage to be browsed.

14. The non-transitory computer-readable storage medium according to claim 13, further comprising: filtering out click paths of which the number of clicks is lower than a first click threshold.

15. The non-transitory computer-readable storage medium according to claim 13, further comprising: filtering out click paths that have first confidence values lower than a first confidence value threshold.

16. A webpage pre-reading apparatus, comprising one or more processors and one or more non-transitory computer-readable memories coupled to the one or more processors and configured with instructions executable by the one or more processors to cause the apparatus to perform operations comprising:
   acquire information of one or more users accessing a first set of multiple webpages within a first period of time;
   determine a first set of click paths through each of which a second webpage is clicked and entered from a first webpage in the first multiple webpages and the number of clicks in each click path in the first set of click paths;
   determine a first confidence value for each click path in the first set of click paths;
   generate a pre-reading list of the first set of click paths based on the first confidence values of the first set of click paths;
   acquire information of each user accessing a second set of multiple webpages within a second period of time which encompasses the first period of time;
   determine a second set of click paths through each of which a third webpage is clicked and entered from each webpage in the second multiple webpages and the number of clicks in each click path in the second set of click paths;
   determining a path click-through rate of each click path in the second set of click paths;
   determining an entropy of each path click-through rate of a set of multiple click paths through which multiple different webpages are clicked and entered from each webpage;
   determine a second confidence value of each click path in the second set of click paths according to the number of clicks of each click path and the entropy of each path click-through rate;
   generate a second pre-reading list of the second set of click paths based on the second confidence values; and
   query for a current click path of a currently browsed webpage from either the first pre-reading list or the second pre-reading list, to pre-read data of a corresponding target webpage to be browsed.

17. The webpage pre-reading apparatus according to claim 16, the operations further comprising: a first pre-processing module configured to perform data cleaning on webpage data of the multiple webpages.

18. The webpage pre-reading apparatus according to claim 16, the operations further comprising: filter out click paths of which the number of clicks is lower than a first click threshold.

19. The webpage pre-reading apparatus according to claim 16, the operations further comprising:
   a second filtering module, for filtering out click paths which has the first confidence value lower than a first confidence value threshold.

* * * * *